(12) United States Patent
Aoki et al.

(10) Patent No.: US 9,505,097 B2
(45) Date of Patent: Nov. 29, 2016

(54) POWER TOOL

(71) Applicant: MAKITA CORPORATION, Anjo-shi, Aichi (JP)

(72) Inventors: Yonosuke Aoki, Anjo (JP); Katsuhito Fujinami, Anjo (JP)

(73) Assignee: MAKITA CORPORATION, Aichi (JP)

( * ) Notice: Subject to any disclaimer, the term of this patent is extended or adjusted under 35 U.S.C. 154(b) by 633 days.

(21) Appl. No.: 13/898,014

(22) Filed: May 20, 2013

(65) Prior Publication Data

US 2013/0319710 A1    Dec. 5, 2013

(30) Foreign Application Priority Data

May 29, 2012    (JP) .................................. 2012-121849

(51) Int. Cl.
  *B23Q 15/08*    (2006.01)
  *B25F 5/00*    (2006.01)
  *B25D 16/00*    (2006.01)

(52) U.S. Cl.
  CPC ............. *B23Q 15/08* (2013.01); *B25D 16/003* (2013.01); *B25F 5/00* (2013.01); *B25F 5/001* (2013.01); *B25D 2250/165* (2013.01); *B25D 2250/221* (2013.01)

(58) Field of Classification Search
  CPC ........ B25F 5/001; B25F 5/00; B25B 21/023; B25D 16/003; B25D 2250/165; B25D 2250/221; B25D 2216/0023; B25D 2250/145; B25D 16/00; B23Q 11/04; B23Q 15/08
  USPC ............................................ 173/2, 176, 178
  See application file for complete search history.

(56) References Cited

U.S. PATENT DOCUMENTS

| 5,584,619 A | 12/1996 | Guzzella |
| 5,914,882 A | 6/1999 | Yeghiazarians |
| 7,628,219 B2 * | 12/2009 | Frauhammer ........... B25F 5/026 173/18 |
| 2002/0066632 A1 | 6/2002 | Kristen et al. |
| 2006/0081386 A1 | 4/2006 | Zhang et al. |

(Continued)

FOREIGN PATENT DOCUMENTS

| EP | 0 199 883 A2 | 11/1986 |
| EP | 1 398 119 A1 | 3/2004 |

(Continued)

OTHER PUBLICATIONS

Aug. 16, 2013 Extended Search Report issued in European Patent Application No. 13 16 8925.9.
Communication issued in European Patent Application No. 13 168 925.9 on Sep. 3, 2014.

(Continued)

*Primary Examiner* — Michelle Lopez
(74) *Attorney, Agent, or Firm* — Oliff PLC (57) ABSTRACT

A power tool enabled to detect an inadvertent rotation at higher accuracy includes a first sensor that detects a first driving information corresponding to a kinetic movement state of the tool body when the tool body is rotated around a longitudinal axis of the tool bit in the event of a working operation of the power tool, a second sensor that detects a second driving information corresponding to an output torque of the tool bit driven by the motor, and a controller connected to the first sensor and the second sensor for controlling the power tool. The controller is configured to calculate holding information corresponding to a holding force of a user to hold the tool body based on the first driving information and the second driving information and control the driving of the power tool based on the holding information.

15 Claims, 3 Drawing Sheets

(56) References Cited

U.S. PATENT DOCUMENTS

2007/0084613 A1    4/2007   Zhang et al.
2011/0162860 A1    7/2011   Gut et al.
2012/0255756 A1   10/2012   Aoki

FOREIGN PATENT DOCUMENTS

JP     A-2011-093073     5/2011
WO   WO 2011/052451 A1   5/2011

OTHER PUBLICATIONS

Dec. 26, 2014 Office Action issued in Chinese Patent Application No. 201310200297.1.
Apr. 7, 2015 Communication issued in European Patent Application No. 13 168 925.9.
Aug. 18, 2015 Office Action issued in Japanese Application No. 2012-121849.
Aug. 4, 2015 Office Action issued in Chinese Application No. 201310200297.1.

* cited by examiner

POWER TOOL

BACKGROUND OF THE INVENTION

1. Field of the Invention

The invention relates to an electric hand-held power tool that performs a predetermined working operation to a work-piece by means of a tool bit rotationally driven by a motor. Particularly, the invention relates to a technique to detect excessive reaction torque exerted onto the power tool when, for example, the tool bit is inadvertently locked.

2. Description of the Related Art

Japanese non-examined laid-open patent publication 2011-093073 discloses a hammer drill that detects an output torque of an electric motor for driving a tool bit, as well as detects a driving state of a tool body around the tool bit by utilizing an acceleration sensor. According to the known hammer drill, the torque transmission between the electric motor and the tool bit is interrupted when predetermined threshold value is detected in order to prevent an inadvertent rotation of the power tool.

On the other hand, it is desired to provide a more accurate system with respect to a detection of such inadvertent rotation of the power tool.

SUMMARY OF THE INVENTION

It is, accordingly, an object of the invention to provide a more accurate system for preventing such inadvertent rotation of the power tool.

In order to accomplish the above object, according to a preferred embodiment of the present invention, a hand-held power tool comprising a tool body and a motor housed in the tool body for performing a predetermined working operation to a work-piece by means of a tool bit rotationally driven by the motor is configured. The "hand-held power tool" of the present invention preferably include a hammer drill for performing a hammer drilling operation through a striking operation in a longitudinal axis direction and a rotational operation around the longitudinal axis direction of the tool bit, an electric drill for performing a drilling operation through a rotational operation of the tool bit, a polishing or grinding tool such as an electric disk grinder for performing a polishing or grinding operation to a work-piece through a rotational operation of the tool bit, a rotary cutter for performing a cutting operation to a work-piece such as a rim saw, and a screw tightening device for performing a screw tightening operation.

A power tool according to a preferred embodiment of the present invention includes a first sensor that detects a first driving information corresponding to a kinetic movement state of the tool body when the tool body is rotated around a longitudinal axis of the tool bit in the event of a working operation of the power tool, a second sensor that detects a second driving information corresponding to an output torque of the tool bit driven by the motor, and a controller connected to the first sensor and the second sensor. The controller is configured to calculate a holding information corresponding to a holding force of a user to hold the tool body based on the first driving information and the second driving information and control the driving of the power tool based on the holding information. "Controlling driving of the power tool" typically corresponds to interrupting torque transmission from the motor to the tool bit. However, controlling driving of the power tool preferably includes aspects of stopping driving of the motor, applying a brake, and the like.

According to the invention, during a working operation by means of the rotating tool bit, the controller calculates the holding information corresponding to a holding force generated by a user holding the power tool based on the first holding information and the second holding information. When the controller determines, based on the calculated holding information, an uncontrollable state in which the user is unable to maintain the holding condition of the power tool, the controller avoids the uncontrollable state, for example, by interrupting the torque transmission to the tool, bit. Thus, according to the present invention, the driving of the power tool is controlled based on the holding information corresponding to the holding force exerted by a user holding the tool body. Therefore, it is possible to more accurately avoid an inadvertent rotation state of the power tool.

In a further aspect of the invention, the first driving information corresponding to a moving state may preferably be represented by one of acceleration, a velocity and a displacement of the tool body around a longitudinal axis thereof. Further, the second sensor detecting the second driving information may preferably be presented by a load-cell provided on a torque transmission path from the motor to the tool bit.

In a further aspect of the invention, the first driving information may preferably be defined by an angular acceleration of the tool body around the longitudinal axis of the tool bit and the second driving information may preferably be defined by an output torque of the tool bit. The controller is configured to integrate the angular acceleration and the output torque in each predetermined time period and calculates the holding information based on the respective integrated values of the angular acceleration and the output torque as obtained by the integration.

In a further aspect of the invention, the controller is configured to control the torque transmission on the torque transmitting path from the motor to the tool bit based on the holding information. While a clutch may typically be used for interrupting the torque transmission, a power supply interrupting device for interrupting power supply to the motor, a brake for stopping or decelerating a rotational movement may also preferably be used.

A further embodiment of the power tool according to the present invention includes an electromagnetic clutch arranged in a torque transmission path. The controller is configured to control the electromagnetic clutch.

Using the electromagnetic clutch enables facilitating control of transmission and interrupting of the torque and downsizing of the power tool.

According to the present invention, such a power tool is provided that an inadvertent rotation of the power tool can be detected more accurately in power tools for performing working by a tool bit driven to rotate. Other objects, features and advantages of the present invention will be readily understood after reading the following detailed description together with the accompanying drawings and the claims.

DETAILED DESCRIPTION OF THE INVENTION

Each of the additional features and method steps disclosed above and below may be utilized separately or in conjunction with other features and method steps to provide and manufacture improved power tools and method for using such power tools and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

Figure 1:
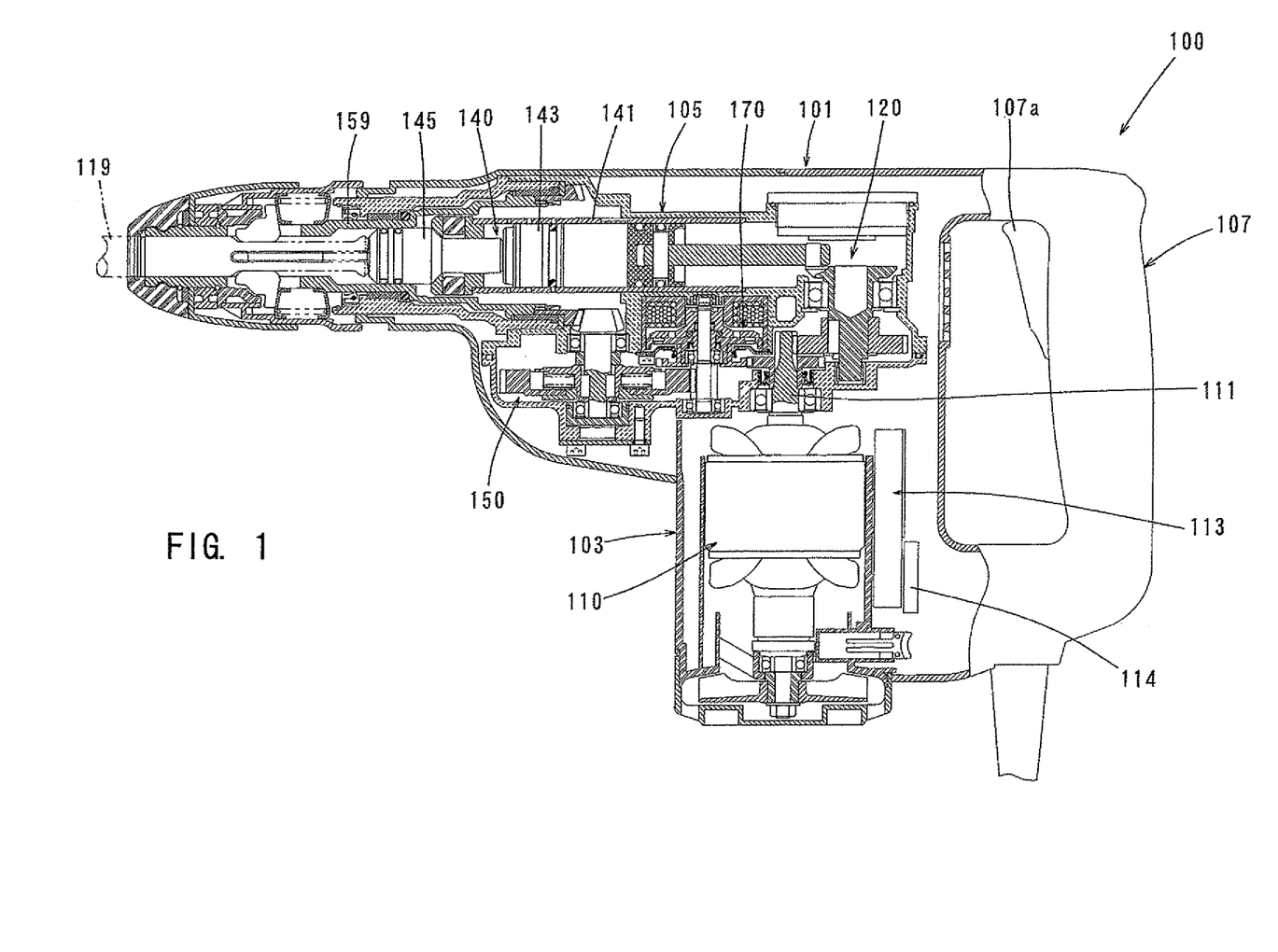
FIG. 1 is a side cross-sectional view entirely showing a hammer drill according to the representative embodiment of the invention.

An embodiment of the present invention is described with reference to FIGS. 1 to 4. The embodiment of the present invention will be described with reference to a powered hammer drill as an example of a power tool. As shown in FIG. 1, in general, a hammer drill 100 of the present embodiment is mainly configured with a tool body 101 constituting a shell of the hammer drill 100. The tool body 101 corresponds to a "tool body" of the present invention. At a tip portion of the tool body 101 is provided a hammer bit 119 through a cylindrical tool holder 159 so that the hammer bit 119 is attachable/detachable to/from the tool body 101. The hammer bit 119 corresponds to a "tool bit" of the present invention. The hammer bit 119 is attached to the tool body 101 so that the hammer bit 119 is movable in an axial direction in relation to the tool holder 159 and rotatable in a circumferential direction with the tool holder 159. At a portion opposite to the tip portion of the tool body 101 is connected a hand grip 107 for user's holding.

In the embodiment, a side where the hammer bit 119 is attached in a longitudinal direction of the tool body 101 is defined as "a front side" or a "front direction side". A side where the hand grip 107 is attached in a longitudinal direction of the tool body 101 is defined as "a back side" or "a back direction side". Similarly, an upper direction and a lower direction in a view in FIG. 1 are respectively defined as "an upper side" or "an upper direction side", and "a lower side" or "a lower direction side".

The tool body 101 is configured with a motor housing 103 containing an electric motor 110 and a gear housing 105 containing a motion converting mechanism 120, a striking element 140 and a power transmission mechanism 150. The electric motor 110 is arranged vertically in a vertical direction in FIG. 1 so that a rotational axis as a rotational axis of a motor shaft 111 thereof is substantially perpendicular to a longitudinal direction of the tool body 101 as a longitudinal direction of the hammer bit 119. A torque of the electric motor 110 is converted into a linear force with the motion converting mechanism 120 in an appropriate manner and is transmitted to the striking element 140 which generates a striking force in a longitudinal direction of the hammer bit 119 as a lateral direction in FIG. 1. The electric motor 110 corresponds to a "motor" in the present invention. The motion converting mechanism 120 and the striking element 140 constitute a "strike driving mechanism."

On the other hand, the torque of the electric motor 110 is transmitted to the hammer bit 119 through the tool holder 159 while a rotational speed of the electric motor 110 is reduced with the power transmitting mechanism 150 so that the hammer hit 119 is driven rotationally in a circumferential direction. The electric motor 110 is electrically driven by pulling a trigger 101a provided with the handgrip 107. The power transmitting mechanism 150 corresponds to a "rotational driving mechanism."

Figure 2:
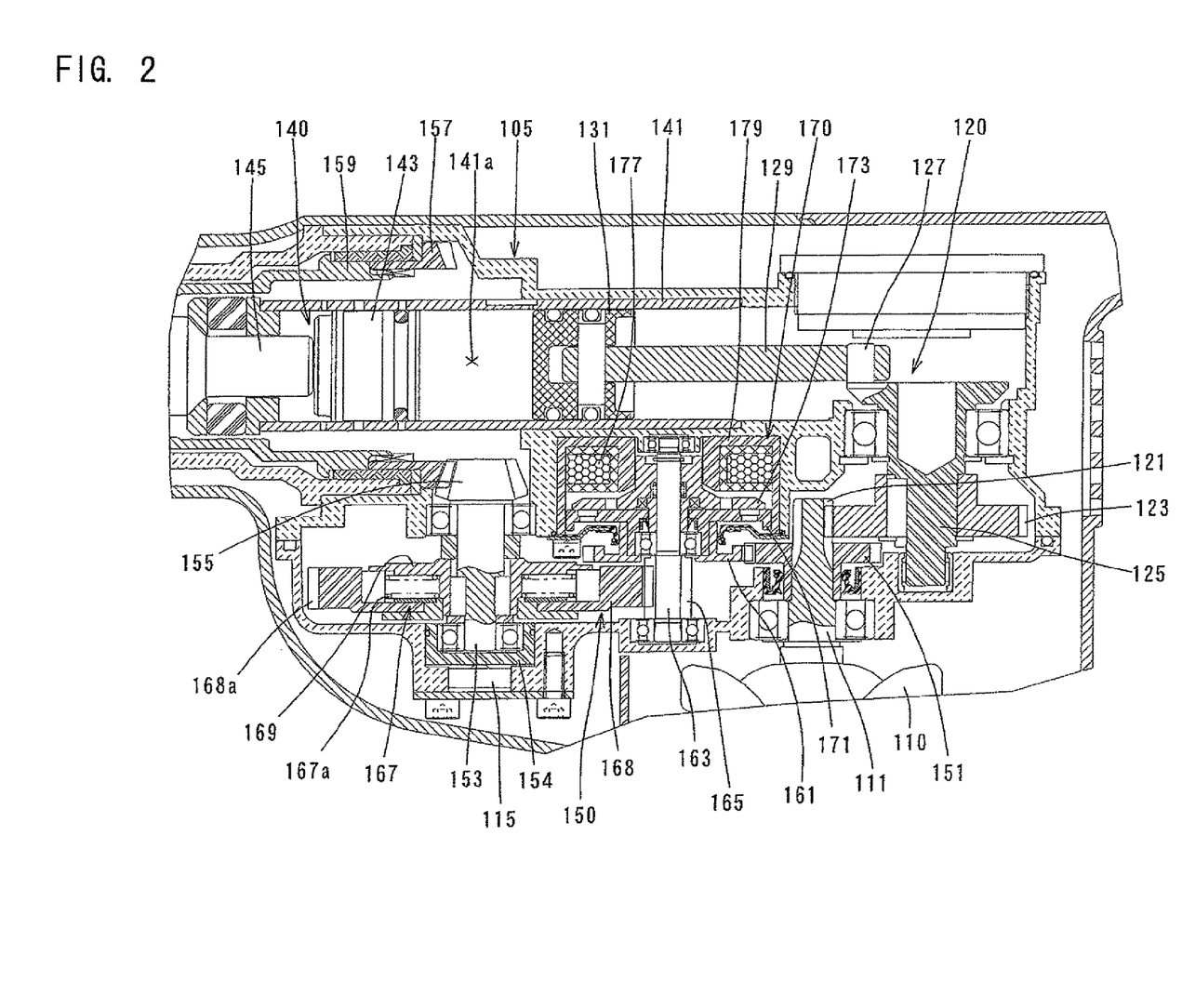
FIG. 2 is a cross-sectional enlarged view showing the main part of the representative hammer drill.

As shown in FIG. 2, the motion converting mechanism 120 is configured with a first driving gear 121 formed on the motor shaft 111 of the electric motor 110 and a crank mechanism driven with a driven gear 123 meshed with the first driving gear 121. The crank mechanism is configured with a crank shaft 125 rotating integrally with the driven gear 123, an offset shaft 127 arranged as displaced from an axis of the crank shaft 125, a piston 131, a connecting rod 129 connecting the piston 131 and the offset shaft 127, and the like. The piston 131 that is provided as a driver for driving the striking element 140 is made slidable in the cylinder 141 in the same direction as a longitudinal axis of the hammer bit 119. The motor shaft 111 of the electric motor 110 and the cylinder 141 are arranged laterally in parallel relationship to each other. The electric motor 110 and the cylinder 141 are arranged such that the longitudinal axes of both of them are perpendicular to each other. The cylinder 141 is fixedly supported in a gear housing 105.

As shown in FIG. 2, the striking element 140 is mainly configured with a striker 143 arranged slidably in the cylinder 141, an impact bolt 145 arranged slidably in the tool holder 159 to transmit kinetic energy of the striker 143 to the hammer bit 119 as an intermediate element. The cylinder 141 having an air chamber 141a defined with the piston 131 and the striker 143 is arranged concentrically with the tool holder 159 at the rear side thereof. The striker 143 is driven by an air spring as pressure variation in the air chamber 141a caused by a sliding movement of the piston 131 to strike or hit the impact bolt 145 and transmits a striking force to the hammer bit 119 through the impact bolt 145.

As shown in FIG. 2, the power transmitting mechanism 150 is mainly configured with a second driving gear 151, a first intermediate gear 161, a first intermediate shaft 163, an electromagnetic clutch 170, a second intermediate gear 165, a mechanical torque limiter 167, a second intermediate shaft 153, a small bevel gear 155, a large bevel gear 157, and the tool holder 159. The power transmitting mechanism 150 transmits a torque of the electric motor 110 to the hammer bit 119.

The tool holder 159 is a cylindrical component with a substantially hollow cylindrical shape. The tool holder 159 is held in the gear housing 105 rotatably around a longitudinal axis of the hammer bit 119 and fixedly in an axial direction. The second driving gear 151 fixed to the motor shaft 111 of the electric motor 110 is driven to rotate in a horizontal plane with the first driving gear 121. In a torque transmission path, the first intermediate shaft 163 and the second intermediate shaft 153 both arranged at a downstream side of the motor shaft 111 are arranged laterally and parallel to each other. The first intermediate shaft 163 provided as a shaft for installing the electromagnetic clutch is arranged between the motor shaft 111 and the second intermediate shaft 153. The first intermediate shaft 163 is driven to rotate with the first intermediate gear 161 usually meshed with the second driving gear 151 through the electromagnetic clutch 170.

The electromagnetic clutch 170 is provided to enable or disable torque transmission between the motor shaft 111 and the hammer bit 119, more specifically between the motor shaft 111 and the second intermediate shaft 153. The electromagnetic clutch 170 constitutes a "torque interrupting mechanism" and corresponds to an "electromagnetic clutch" in the present invention. The electromagnetic clutch 170 is provided as a means of preventing rotation of the tool body 101 by unusual increase of a reaction torque applied to the tool body 101 as a torque caused reversely to a rotational direction of the hammer bit 119 in such a case that the hammer bit 119 is inadvertently locked by a work-piece during a hammer drilling work. The electromagnetic clutch 170 is installed on the first intermediate shaft 163. The electromagnetic clutch 170 is arranged at an upper side of the first intermediate gear 161 in a longitudinal axis direction of the first intermediate shaft 163 as in a vertical direction and is closer to a moving axis of the striker 143 as a striking axis than the first intermediate gear 161.

The electromagnetic clutch 170 is of a frictional type utilizing friction and is mainly configured with a driving side clutch part 171 of disc shape, a driven side clutch part 173 of disc shape, a clutch spring 175, an electromagnetic coil 177, and a coil container 179 containing the electromagnetic coil 177. The driving side clutch part 171 and the driven side clutch part 173 are arranged at an upper side and a lower side respectively in a longitudinal axis direction of the first intermediate shaft 163 as a longitudinal axis direction of the electromagnetic clutch 170. The driving side clutch part 171 and the driven side clutch part 173 are arranged at opposing positions in a relatively moving manner. When the electromagnetic coil 177 is energized, the driving side clutch part 171 and the driven side clutch part 173 are relatively moved in a mutually approaching direction by an electromagnetic force generated by the energization of the electromagnetic coil 177 and are touched at their frictional surfaces to cause friction contact or an engagement therebetween to transmit the torque. When the energization of the electromagnetic coil 177 is stopped, the driving side clutch part 171 and the driven side clutch part 173 are relatively moved in a mutually separating direction to release the engagement by the clutch spring 175 as an urging part for usually urging the driving side clutch part 171 and the driven side clutch part 173 in a direction for releasing the engagement to interrupt the torque transmission.

The driving side clutch part 171 is configured to rotate integrally with the first intermediate gear 161. Namely, the torque of the electric motor 110 is input to the electromagnetic clutch 170 through the first intermediate gear 161. On the other hand, the driven side clutch part 173 is attached to the first intermediate shaft 163 at an end in a longitudinal axis direction or at an upper end side to rotate integrally therewith. The second intermediate gear 165 is provided to the first intermediate shaft 163 at another end in a longitudinal axis direction thereof or at a lower end side. There is provided a configuration in which the torque of the driven side clutch part 173 is output at the mechanical torque limiter 167 as shown in FIG. 2 from the second intermediate gear 165 through a third intermediate gear 168a meshed with the second intermediate gear 165. In the present embodiment, the first intermediate shaft 163 is provided as an output shaft of the electromagnetic clutch 170.

Figure 3:
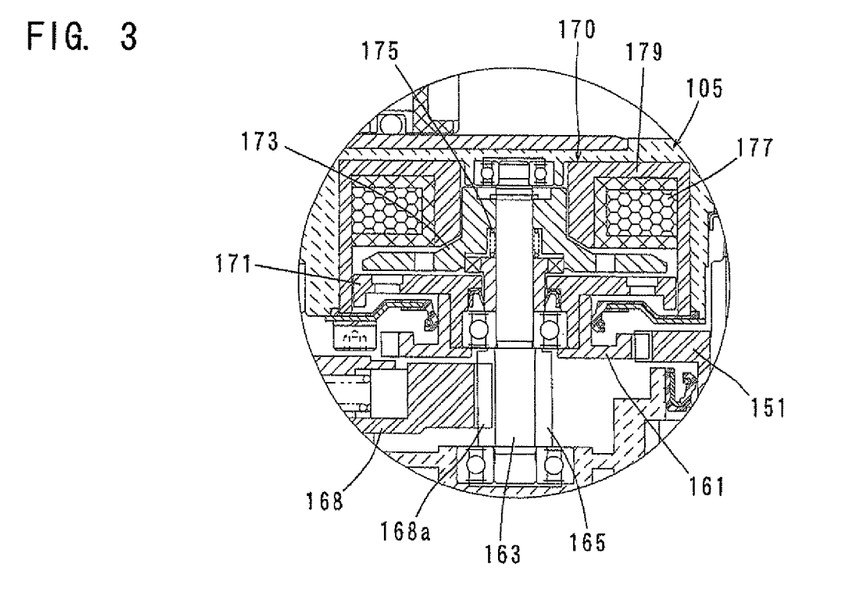
FIG. 3 is a cross-sectional enlarged view showing a clutch in a torque transmission interrupting state.
Figure 4:
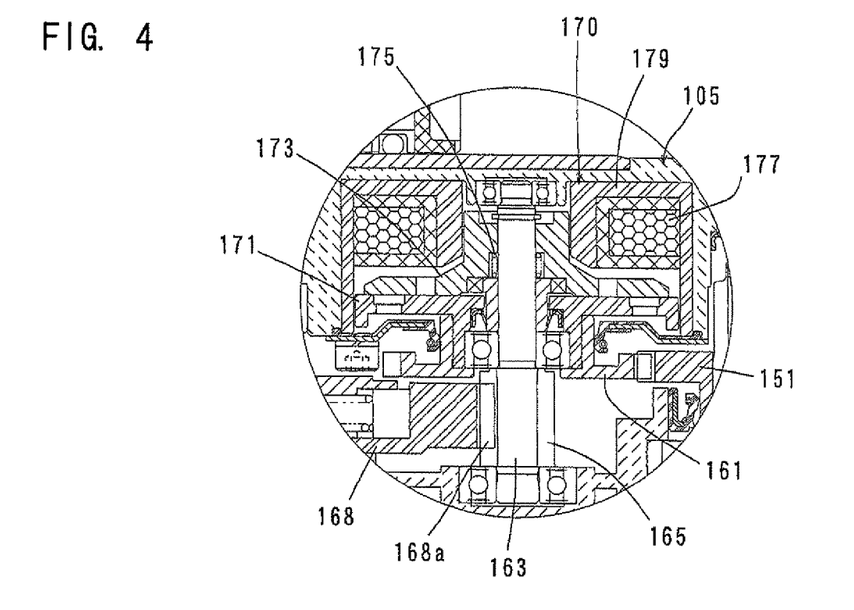
FIG. 4 is a cross-sectional enlarged view showing a clutch in a torque transmitting state.

In the electromagnetic clutch 170 of the above configuration, the driven side clutch part 173 is moved in a longitudinal axis direction thereof according to supplying and stopping of an electric current to the electromagnetic coil 177 based on instructions from a controller 113 shown in FIG. 1. The torque is transmitted by engagement or friction contact between the driving side clutch part 171 and the driven side clutch part 173 as shown in FIG. 3 and the torque transmission is interrupted by releasing the engagement or separating the driving side clutch part 171 and the driven side clutch part 173 to each other as shown in FIG. 4.

As shown in FIG. 2, there is provided a configuration in which the torque output from the electromagnetic clutch 170 is transmitted to the second intermediate shaft 153 through the mechanical torque limiter 167. The mechanical torque limiter 167 is a safety device with regard to overload on the hammer bit 119 that interrupts torque transmission to the hammer bit 119 when an excessive torque exceeding a designed value or a maximum transmissible torque value has been applied to the hammer bit 119. The mechanical torque limiter 167 is provided to the second intermediate shaft 153 in a concentric manner.

As shown in FIG. 2, the mechanical torque limiter 167 includes a driving side part 168 having the third intermediate gear 168a meshed with the second intermediate gear 165 and a driven side part 169 rotating integrally with the second intermediate shaft 153. Although the detail is not shown in the drawing, the mechanical torque limiter 167 is configured such that a torque is transmitted between the driving side part 168 and the driven side part 169 when a torque applied to the second intermediate shaft 153 corresponding to the torque applied to the hammer bit 119 is equal to or smaller than a maximum transmissible torque preset by the spring 167a and the torque transmitted between the driving side part 168 and the driven side part 169 is interrupted when the torque applied to the second intermediate shaft 153 exceeds the maximum transmissible torque. A rotational speed ratio between the third intermediate gear 168a of the driving side part 168 and the second intermediate gear 165 is set such that the rotational speed of the former is smaller than the latter.

The present embodiment includes a configuration in which the torque transmitted to the second intermediate shaft 153 is transmitted from the small bevel gear 155 integrally provided to the second intermediate shaft 153 to the hammer bit 119 through the large bevel gear 157 meshed with the small bevel gear 155 and the tool holder 159 as a final output shaft coupled with the large bevel gear 157.

According to the hammer drill 100 configured as described above, when a user holding the hand grip 107 draws a trigger 107a to supply an electric power to the electric motor 110, the piston 131 of the motion converting mechanism 120 is forced to slide linearly along the cylinder 141. The sliding of the piston 131 causes the striker 143 to move linearly in the cylinder 141 by means of an effect of an air spring as a pressure change in the air in the air chamber 141a of the cylinder 141. Impinging on the impact bolt 145 of the striker 143 transmits kinetic energy thereof to the hammer bit 119.

On the other hand, the torque of the electric motor 110 is transmitted to the tool holder 159 of the power transmission mechanism 150. Thereby, the tool holder 159 is driven to rotate in a vertical plane and the hammer bit 119 is rotated integrally with the tool holder 159. Accordingly, the hammer bit 119 operates as a hammer in an axial direction and as a drill in a circumferential direction to perform hammer drilling operation as boring to a work-piece such as a concrete part.

During the hammer drilling operation as described above, when the hammer bit 119 is caught by the work-piece and locked inadvertently, there arises a possibility of inadvertent rotation of the entire hammer drill 101 due to a reaction torque as a rotational force in a direction opposite to that of the hammer bit 119 applied to the tool body 101 of the hammer drill 100.

Considering the above, in the present embodiment, so as to detect the condition that the hammer drill 100 is inadvertently rotated, an acceleration sensor for detecting a moving condition of the tool body 101 around a longitudinal axis of the hammer bit 119 and a load-cell 115 as a means for detecting a torque applied to the hammer bit 119 are provided. The acceleration sensor 114 and the load-cell 115 correspond to a "first sensor" and a "second sensor" of the present invention, respectively. The acceleration sensor 114 and the load-cell 115 are electrically connected to the controller 113 that corresponds to a "control apparatus" of the present invention.

As shown in FIG. 1, the acceleration sensor 114 is arranged in the controller 113. The acceleration sensor 114 may be arranged at any position where a moving condition of the tool body 101 or the hand grip 101 around a longitudinal axis of the hammer bit 119 can be detected, that is, a part moving integrally with the tool body 101. From a view point of enhancing a detecting sensitivity of the acceleration sensor 114, the acceleration sensor 114 may be arranged preferably at a position where a larger momentum is applied, separated from a rotational axis of the hammer bit 119 as much as possible in a radial axis direction crossing the rotational axis.

As shown in FIG. 2, the load-cell 115 is fixedly provided in the power transmission mechanism 150 constituting a torque transmission path as opposing to an axial end surface of a bearing cover 154 containing a bearing of the second intermediate shaft 15, and is positioned such that a gauge part of the load-cell 115 contacts an axial end surface of the bearing cover 154, that is, a plane surface arranged in a direction crossing a longitudinal axis of the second intermediate shaft 153. The load-cell 115 detects a thrust load applied to the second intermediate shaft 153 through the small bevel gear 155 when the torque of the electric motor 110 is transmitted to the hammer bit 119.

During the hammer drilling operation, the acceleration sensor 114 measures an acceleration of the controller 113 moving integrally with the tool body 101 and outputs a measurement result to the controller 113. On the other hand, the load-cell 115 measures a thrust load caused to the second intermediate shaft 153 and outputs a measurement result to the controller 113. In other words, the acceleration sensor 114 outputs an acceleration value as information on a moving condition of the tool body 101 during the hammer drilling operation to the controller 113. Information indicating an acceleration of the tool body 101 corresponds to "first driving information."

The load-cell 115 outputs a value of the thrust load of the second intermediate shaft 153 during the hammer drilling operation or information on an output torque generated by the electric motor 110 to drive the hammer bit 119 to rotate to the controller 113. The information on the output torque generated by the electric motor 110 corresponds to "second driving information" in the present invention.

The controller 113 performs operational processing on outputs from the acceleration sensor 114 and the load-cell 115 and calculates a holding force of a user as required for holding the tool body 101 according to the outputs from the acceleration sensor 114 and the load-cell 115. When the controller 113 has determined the holding force cannot match a reaction torque caused to the tool body 101, the controller 113 interrupts power transmission through the electromagnetic clutch 170. Information on the holding force for the tool body 101 by an user corresponds to "holding information" in the present invention.

More specifically, the controller 113 performs an operational processing on an acceleration value per a predetermined time period output from the acceleration sensor 114, integrates an angular acceleration value as obtained, and obtains an integrated angular acceleration value as an angular velocity. Meanwhile, the controller 113 integrates an output torque a predetermined time period obtained by the load-cell 115 to obtain an integrated output torque value. Then, the controller 113 calculates a holding force exerted by a user who holds the hammer drill 100 according to a relationship between the integrated angular acceleration value and the integrated output torque value. Such holing force by an user defines an external resistance. Further, the controller 113 calculates an estimated stop angle of the tool body 101 that is an angle from starting of an inadvertent rotation for the tool body 101 till stop of the tool body 101 that is interruption of torque transmission by the electromagnetic clutch 170 through detection by the acceleration sensor 114 and the load-cell 115. Then, if such an expectation is made that the calculated estimate stop angle will not reach such an angle that a user cannot control the hammer drill 100, power supply to the electromagnetic coil 177 of the electromagnetic clutch 170 is maintained. On the other hand, if such an expectation is made that the calculated estimate stop angle will reach an angle of uncontrollable condition for a user, power supply to the electromagnetic coil 177 of the electromagnetic clutch 170 is stopped to interrupt the torque transmission by the electromagnetic clutch 170. According to the above configuration, it is prevented that the tool body 101 is inadvertently rotated. Maintenance or interruption of torque transmission by the electromagnetic clutch 170 corresponds to "controlling driving of a power tool" in the present invention.

As described above, according to the present embodiment, a holding force for the tool body 101 by a user is obtained based on the outputs from the acceleration sensor 114 and the load-cell 115, and driving of the hammer drill 100 is continued or stopped based on the holding force as obtained. As a result, a condition that the hammer drill 100 is inadvertently rotated can be detected more accurately.

In the present embodiment, a holding force required for a user to hold the hammer drill 100 is calculated based on the integrated angular acceleration value and the integrated output torque value. However, the holding force may be calculated based on an integrated acceleration value obtained by integrating an acceleration value and an integrated output torque value obtained by integrating an output torque.

Further, though the electromagnetic clutch 170 is used as a torque interrupting mechanism in the present embodiment, a power supply interrupting device for interrupting power supply to the electric motor 110 or a brake for stopping or reducing a rotational movement, or the like may be employed instead of the electromagnetic clutch 170.

Furthermore, the present embodiment is described referring to an electric hammer drill 100 as an example of power tools. However, in the present embodiment, power tools other than the hammer drill can be employed such as an electric drill for a boring operation, an electric disc grinder for grinding and/or polishing work, a rotary cutter for cutting a work-piece like a rim saw, a screw tightening device for tightening a screw, and the like.

DESCRIPTION OF NUMERALS

100 Hammer drill (Power tool)
101 Tool body (Tool body)

103 Motor housing
105 Gear Housing
107 Handgrip
107a Trigger
110 Electric motor (motor)
111 Motor shaft
113 Controller (Controller)
114 Acceleration sensor (First sensor)
115 Load cell (Second sensor)
119 Hammer bit (tool bit)
120 Motion converting mechanism
121 First driving gear
123 Driven gear
125 Crank shaft
127 Offset shaft
129 Connecting rod
131 Piston
140 Striking element
141 Cylinder
141a Air chamber
143 Striker
145 Impact bolt
150 Power transmitting mechanism
151 Second driving gear
153 Second intermediate shaft
154 Bearing cover
155 Small bevel gear
157 Large bevel gear
159 Tool holder
161 First intermediate gear
163 First intermediate shaft
165 Second intermediate gear
167 Mechanical torque limiter
167a Spring
168 Driving-side member
168a Third intermediate gear
169 Driven-side member
170 Electromagnetic clutch
171 Driving-side clutch member
173 Driven-side clutch member
175 Clutch spring
177 Electromagnetic coil
179 Coil housing member

What we claim is:

1. A hand-held power tool configured to drive a removable tool bit about a longitudinal axis, the power tool comprising:
   a tool body;
   a tool holder configured to removably hold the tool bit;
   a motor that is housed in the tool body, the motor configured to rotatably drive the tool bit;
   a torque transmission path connecting the motor to the tool holder;
   a first sensor that detects a first driving information corresponding to a kinetic movement state of the tool body when the tool body is rotated around the longitudinal axis in the event of a working operation of the power tool;
   a second sensor that detects a second driving information corresponding to an output torque of the tool bit driven by the motor; and,
   a controller that controls the power tool, wherein the controller is connected to the first sensor and the second sensor, wherein the controller calculates a holding information corresponding to holding force of the user to hold the tool body based on the first driving information and the second driving information, and controls the driving of the power tool based on the holding information.

2. The power tool according to claim 1, wherein the first driving information is information selected from the group consisting of an acceleration, a velocity and a displacement of the tool body.

3. The power tool according to claim 1, wherein the second sensor is defined by a load-cell provided on the torque transmission path from the motor to the tool bit.

4. The power tool according to claim 1, wherein the first driving information is defined by an angular acceleration of the tool body around the longitudinal axis and the second driving information is defined by an output torque of the tool bit and wherein the controller integrates the angular acceleration and the output torque in each predetermined time period and calculates the holding information based on the respective integrated values of the angular acceleration and the output torque.

5. The power tool according to claim 1, wherein the controller controls torque transmission on the torque transmitting path from the motor to the tool bit based on the holding information.

6. The power tool according to claim 5 further comprising an electromagnetic clutch provided on the torque transmission path, wherein the controller controls the electromagnetic clutch.

7. The power tool according to claim 4, wherein the holding information corresponds to a user's ability to disrupt unintended motion of the power tool body such that a low holding force corresponds to a low ability of a user to disrupt unintended motion of the tool body, and a high holding force corresponds to a high ability of a user to disrupt unintended motion of the tool body.

8. The power tool according to claim 1, further comprising an electromagnetic clutch provided on the torque transmission path, wherein the controller controls the electromagnetic clutch so as to disrupt the torque transmission path based on the holding information in order to prevent inadvertent swinging of the power tool, and wherein the holding information corresponds to a user's ability to disrupt unintended motion of the power tool body such that a low holding force corresponds to a low ability of a user to disrupt unintended motion tool body, and a high holding force corresponds to a high ability of a user to disrupt unintended motion of the tool body.

9. The power tool according to claim 8, wherein the controller controls the electromagnetic clutch to disrupt the torque transmission path sooner for a low calculated holding force than for a high calculated holding force.

10. The power tool according to claim 1, wherein the controller controls the power tool to disrupt the torque transmission path sooner for a low calculated holding force than for a high calculated holding force.

11. The power tool according to claim 1, wherein the torque transmission path includes:
   an output shaft configured to be rotated by the motor;
   a first intermediate shaft configured with a clutch, the clutch configured to disrupt the torque transmission path based on the holding information, the first intermediate shaft configured to be driven by the output shaft; and
   a second intermediate shaft driven by the first intermediate shaft and configured to drive the removable tool bit about the longitudinal axis, wherein the output shaft, the first intermediate shaft, and the second intermediate shaft are parallel to each other but not coaxially aligned with each other.

12. The power tool according to claim 11, wherein a first torque generated about the output shaft is lower than a second torque generated about the first intermediate shaft, which is lower than a third torque generated about the second intermediate shaft.

13. The power tool according to claim 12, wherein the second sensor is configured to detect driving information corresponding to the third torque generated about the second intermediate shaft.

14. The power tool according to claim 1, wherein the controlling of the power tool based on the holding information consists of disrupting the torque transmission path in order to prevent an uncontrollable state in which the user is unable to prevent an inadvertent swinging motion of the power tool.

15. A hand-held power tool configured to drive a removable tool bit about a longitudinal axis, the power tool comprising:
a tool body;
a tool holder configured to removably hold the tool bit;
a motor that is housed in the tool body, the motor configured to rotatably drive the tool bit;
a torque transmission path connecting the motor to the tool holder;
a first sensor that detects a first driving information corresponding to a kinetic movement state of the tool body when the tool body is rotated around the longitudinal axis in the event of a working operation of the power tool;
a second sensor that detects a second driving information corresponding to an output torque of the tool bit driven by the motor; and
a controller that controls the power tool, wherein the controller is connected to the first sensor and the second sensor, wherein the controller calculates a holding information corresponding to holding force of the user to hold the tool body and controls the driving of the power tool based on the holding information, wherein the first driving information is defined by an angular acceleration of the tool body around the longitudinal axis and the second driving information is defined by an output torque of the tool bit, and wherein the controller integrates the angular acceleration and the output torque in each predetermined time period and calculates the holding information based on the respective integrated values of the angular acceleration and the output torque.

* * * * *